(12) United States Patent
Kaneko (10) Patent No.: US 10,971,193 B2
(45) Date of Patent: Apr. 6, 2021

(54) BASE UNIT AND OPTICAL DISK DEVICE

(71) Applicant: SONY SEMICONDUCTOR SOLUTIONS CORPORATION, Kanagawa (JP)

(72) Inventor: Takeshi Kaneko, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/628,696

(22) PCT Filed: Jun. 19, 2018

(86) PCT No.: PCT/JP2018/023184
§ 371 (c)(1),
(2) Date: Jan. 6, 2020

(87) PCT Pub. No.: WO2019/031068
PCT Pub. Date: Feb. 14, 2019

(65) Prior Publication Data
US 2020/0185008 A1    Jun. 11, 2020

(30) Foreign Application Priority Data
Aug. 8, 2017  (JP) .............................. JP2017-152826

(51) Int. Cl.
*G11B 33/14*      (2006.01)
*G11B 25/04*      (2006.01)
(Continued)

(52) U.S. Cl.
CPC ............ *G11B 33/14* (2013.01); *G11B 25/043* (2013.01); *G11B 33/12* (2013.01); *H02K 9/22* (2013.01)

(58) Field of Classification Search
CPC ....... G11B 33/14; G11B 25/043; G11B 33/12; H02K 9/22
See application file for complete search history.

(56) References Cited

U.S. PATENT DOCUMENTS 4,488,192 A * 12/1984 Treseder ............ G11B 23/0323
360/99.16
4,623,810 A * 11/1986 Smith ..................... F16C 35/02
310/43
(Continued)

FOREIGN PATENT DOCUMENTS

CN    101086892 A    12/2007
JP    54-055413 A    5/1979
(Continued)

OTHER PUBLICATIONS

International Search Report and Written Opinion of PCT Application No. PCT/JP2018/023184, dated Aug. 7, 2018, 08 pages of ISRWO.

(Continued)

*Primary Examiner* — Brian E Miller
(74) *Attorney, Agent, or Firm* — Chip Law Group (57) ABSTRACT

Provided is a base unit including a base unit chassis that supports a spindle motor, a heat dissipation member that dissipates heat generated from a stator of the spindle motor to a non-disk mounting side of the base unit chassis, and a bearing housing that suppresses heat transfer from a stator core to a bearing of the spindle motor.

6 Claims, 6 Drawing Sheets

(51) Int. Cl.
    *G11B 33/12*    (2006.01)
    *H02K 9/22*     (2006.01)

(56) References Cited

U.S. PATENT DOCUMENTS

| | | | | |
|---|---|---|---|---|
| 4,634,908 A * | 1/1987 | Sturm | .................... | H02K 1/187 165/185 |
| 5,731,646 A * | 3/1998 | Heinze | .................... | F16C 35/02 310/43 |
| 6,072,661 A * | 6/2000 | Schirle | ................. | G11B 25/043 360/99.08 |
| 6,429,559 B1 * | 8/2002 | Severien | ............. | H02K 5/1732 310/43 |
| 2001/0045782 A1 * | 11/2001 | Lieu | ........................ | H02K 5/165 310/67 R |
| 2003/0081347 A1 * | 5/2003 | Neal | ........................ | G11B 33/02 360/99.15 |
| 2004/0222712 A1 * | 11/2004 | Hong | ...................... | H02K 11/33 310/67 R |
| 2007/0013240 A1 * | 1/2007 | Aiello | .................. | H02K 5/1675 310/52 |
| 2008/0067890 A1 * | 3/2008 | Tamaoka | ............ | H02K 5/1675 310/272 |
| 2009/0072642 A1 * | 3/2009 | Miyamori | ............. | G11B 33/12 310/90 |
| 2010/0211964 A1 * | 8/2010 | Yeh | ....................... | G11B 19/046 720/695 |
| 2013/0026867 A1 * | 1/2013 | Deguchi | .................. | H02K 9/19 310/53 |
| 2013/0106212 A1 * | 5/2013 | Nakazumi | ................ | H02K 9/22 310/65 |
| 2013/0236340 A1 * | 9/2013 | Kawano | .................. | F04B 17/03 417/420 |
| 2014/0319936 A1 * | 10/2014 | Makino | ................... | H02K 9/00 310/43 |

FOREIGN PATENT DOCUMENTS

| | | |
|---|---|---|
| JP | 02-130787 A | 5/1990 |
| JP | 10-070780 A | 3/1998 |
| JP | 2004-164701 A | 6/2004 |
| JP | 2007-143205 A | 6/2007 |
| JP | 2007-257724 A | 10/2007 |
| JP | 2007-323784 A | 12/2007 |
| JP | 2010-055662 A | 3/2010 |

OTHER PUBLICATIONS

Office Action for CN Application No. 201880044463, dated Dec. 1, 2020.

* cited by examiner

BASE UNIT AND OPTICAL DISK DEVICE

CROSS REFERENCE TO RELATED APPLICATIONS

This application is a U.S. National Phase of International Patent Application No. PCT/JP2018/023184 filed on Jun. 19, 2018, which claims priority benefit of Japanese Patent Application No. JP 2017-152826 filed in the Japan Patent Office on Aug. 8, 2017. Each of the above-referenced applications is hereby incorporated herein by reference in its entirety.

TECHNICAL FIELD

The present technology relates to a base unit and an optical disk device on which the base unit is mounted.

BACKGROUND ART

A base unit (also referred to as a disk drive) is known provided with, inside a case, a mechanism for loading and unloading an optical disk, a spindle motor for rotating the optical disk, an optical head for writing data to the optical disk and reading data from the optical disk, a sled motor and a feed mechanism to move the optical head in a radial direction of the optical disk, and a substrate on which circuit components such as a system controller for controlling a system are attached.

In the base unit, when the spindle motor is operated, the temperature of the stator coil and the stator core rises mainly by heat generation due to the internal resistance of the stator coil. In particular, in a case where an outer rotor type spindle motor is operated, since the rotor covers the stator core and the stator coil, the temperature rise of the stator core and the stator coil tends to increase. For example, when operation (seek operation) is performed for moving the optical head at high speed in the radial direction of the optical disk with a constant linear velocity (CLV) method, it is necessary to rapidly change the rotational speed of the optical disk, and the spindle motor tends to be very hot.

There is a problem that performance of the spindle motor is adversely affected when the temperature of the spindle motor becomes very high. Furthermore, there has been a problem that, in the mechanical configuration of the conventional base unit, due to the temperature rise of the spindle motor, disk deformation (warping) due to thermal expansion occurs since the temperature rise of the surface on the motor rotor side of the optical disk increases, and drive performance is adversely affected.

Moreover, the housing part that holds the bearing and iron core of the spindle motor includes a metal member, and heat due to heat generation of the stator coil is transferred to the bearing, and the temperature rise of the bearing has an adverse effect on the bearing life characteristics. Moreover, the heat is transferred to the shaft, and causes the temperature rise of the optical disk through the turntable that holds the optical disk from the shaft, and there has been a possibility that the optical disk is deformed.

Proposals have been made to solve the problems due to heat generation of the spindle motor. For example, Patent Document 1 describes that heat transfer to the bearing is suppressed by providing an element that performs cooling by thermoelectric conversion in the housing part that holds the iron core and the bearing.

Furthermore, Patent Document 2 describes that a heat dissipation material having good radiation heat dissipation is used as a mounting plate for the spindle motor, and heat generation of the coil is dissipated from the bearing housing to the non-disk mounting side through the mounting plate for the spindle motor.

Patent Document 3 describes that the coil that is a heat generation source is embedded in a resin chassis to prevent heat transfer to the rotor.

Patent Document 4 describes a heat dissipation mechanism of a fan motor, and a heat dissipation plate is attached to a metal housing that houses the bearing so that the heat of the coil is efficiently dissipated.

CITATION LIST

Patent Document

Patent Document 1: Japanese Patent Application Laid-Open No. 2007-323784

Patent Document 2: Japanese Patent Application Laid-Open No. 2007-257724

Patent Document 3: Japanese Patent Application Laid-Open No. 10-70780

Patent Document 4: Japanese Patent Application Laid-Open No. 2007-143205

SUMMARY OF THE INVENTION

Problems to be Solved by the Invention

The configuration in which cooling is performed by the thermoelectric conversion element as described Patent Document 1 has a problem that a relatively expensive element is required, and there is a problem that the cost increases in mass production.

In the configuration described in Patent Document 2, heat generated in the coil is transferred from the housing to the bearing, and further transferred to the turntable that holds the optical disk, and there has been a possibility that the optical disk is deformed.

In the configuration described in Patent Document 3, it is necessary to use a resin with good heat conductivity to dissipate heat through the resin chassis, and there has been a problem that the cost increases of use of the resin with good heat conductivity. In a case where the chassis includes general resin, the heat conductivity of the resin is low and the heat generated from the coil is not dissipated, so that the heat accumulates around the coil and becomes hot, and there has been a problem that the characteristics and life of the motor are affected.

The configuration described in Patent Document 4 relates to the heat dissipation of the fan motor, and cannot solve the deformation such as the warping of the optical disk. Moreover, in the configuration described in Patent Document 4, the heat of the metal housing is transferred to the bearing, and there has been a possibility that deterioration of the bearing is caused.

Thus, an object of the present technology is to provide a base unit and an optical disk device enabled to prevent the heat generated in the coil of the spindle motor from being transferred to the bearing, and prevent the deformation of the optical disk due to the heating of the rotor side surface of the optical disk.

Solutions to Problems

The present technology is a base unit including:
a base chassis that supports a spindle motor;
a heat dissipation member that dissipates heat generated from a stator of the spindle motor to a non-disk mounting side of the base chassis; and
a means that suppresses heat transfer from a stator core to a bearing of the spindle motor.

Furthermore, the present technology is an optical disk device on which the base unit is mounted.

Effects of the Invention

According to at least one embodiment, the heat generated in the stator coil of the spindle motor is dissipated to the non-disk mounting side by the heat dissipation member, and the heat transfer from the stator core to the bearing is suppressed, whereby the temperature rise of the spindle motor and the optical disk can be suppressed, and an adverse effect on the performance of the spindle motor and thermal expansion deformation of the optical disk (warping of the optical disk) can be prevented. Note that, the effects described here are not necessarily limited, and may be any of effects described in the present technology or an effect different from the effects. Furthermore, the contents of the present technology are not to be construed as being limited by the exemplified effect in the following description.

MODE FOR CARRYING OUT THE INVENTION

Embodiments described below are suitable specific examples of the present technology, and have various technically preferable limitations. However, the scope of the present technology is not limited to these embodiments unless specifically described in the following description to the effect of limiting the present technology.

Note that, the description of the present technology will be made in the following order.

<1. Embodiment>
<2. Modifications>

1. Embodiment

One embodiment of the present technology is an optical disk device that records and/or reproduces information on an optical disk. Various types (formats) of optical disks can be used. For example, those are CD-ROM, CD-R, CD-RW, DVD-ROM, DVD-R, DVD-RW, DVD-RAM, DVD+R, DVD+RW, BD-ROM, BD-R, BD-RE, and the like.

"Example of Base Unit"

Figure 1:
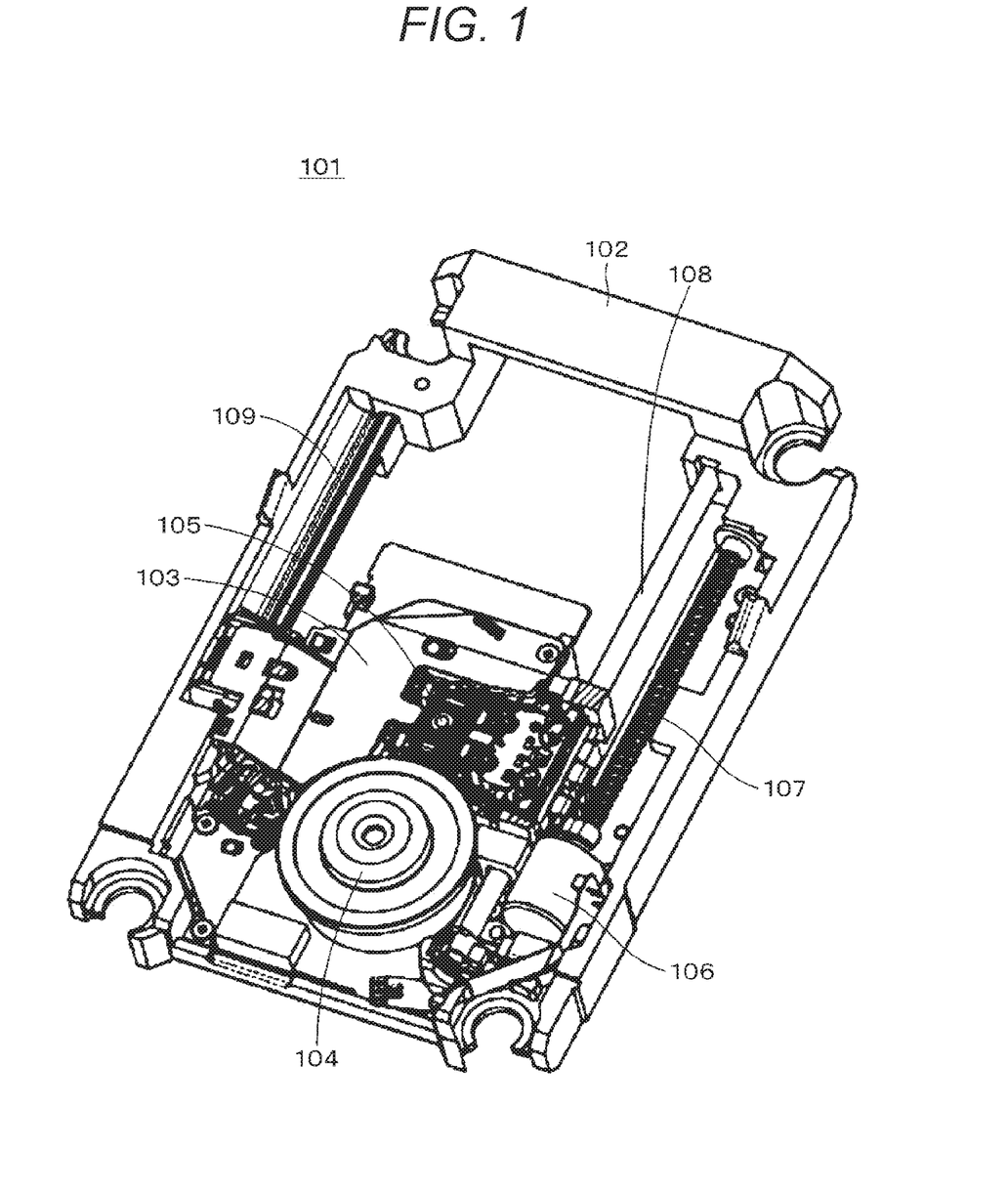
FIG. 1 is a perspective view of a base unit according to an embodiment of the present technology.

An example will be described of a base unit of the optical disk device to which the present technology can be applied. As illustrated in FIG. 1, in a base unit 101, required members and mechanisms are arranged inside a case (not illustrated), and a disk insertion slot (not illustrated) is formed in the case. The base unit 101 includes a base unit chassis 102. The base unit chassis 102 is of a frame type having an opening in the center, and an optical pickup 103 is moved in the opening.

A turntable 104 is fixed on a rotating shaft of a spindle motor attached to the base unit chassis 102. When the optical disk is used, the center hole of the optical disk inserted into the case is fitted to the turntable 104. The optical disk is conveyed onto the turntable 104 by a loading mechanism (not illustrated). Note that, as the loading mechanism, either a known slot-in type (drawing type) or a tray type may be used.

The optical pickup 103 is provided to be slidable by an optical pickup transfer mechanism. The optical pickup 103 has a configuration in which an optical element such as an objective lens 105, a laser diode, a photoelectric conversion element, and the like are attached to a base, and records information on the optical disk and reads information from the optical disk.

A feed motor 106 is provided in the base unit chassis 102 to feed the optical pickup 103. A feed screw 107 rotated by the feed motor 106 is arranged on the base unit chassis 102. The base of the optical pickup 103 and the feed screw 107 are coupled together. A guide shaft (a first guide part or a main shaft) 108 of metal is arranged on the base unit chassis 102 for guiding when the optical pickup 103 is transferred. The base unit chassis 102 is formed with a guide part 109 (a second guide part or an auxiliary shaft). The guide part 109 is a convex part formed at the end of the base unit chassis 102 in parallel with the guide shaft 108.

"Configuration Around Spindle Motor"

Figure 2:
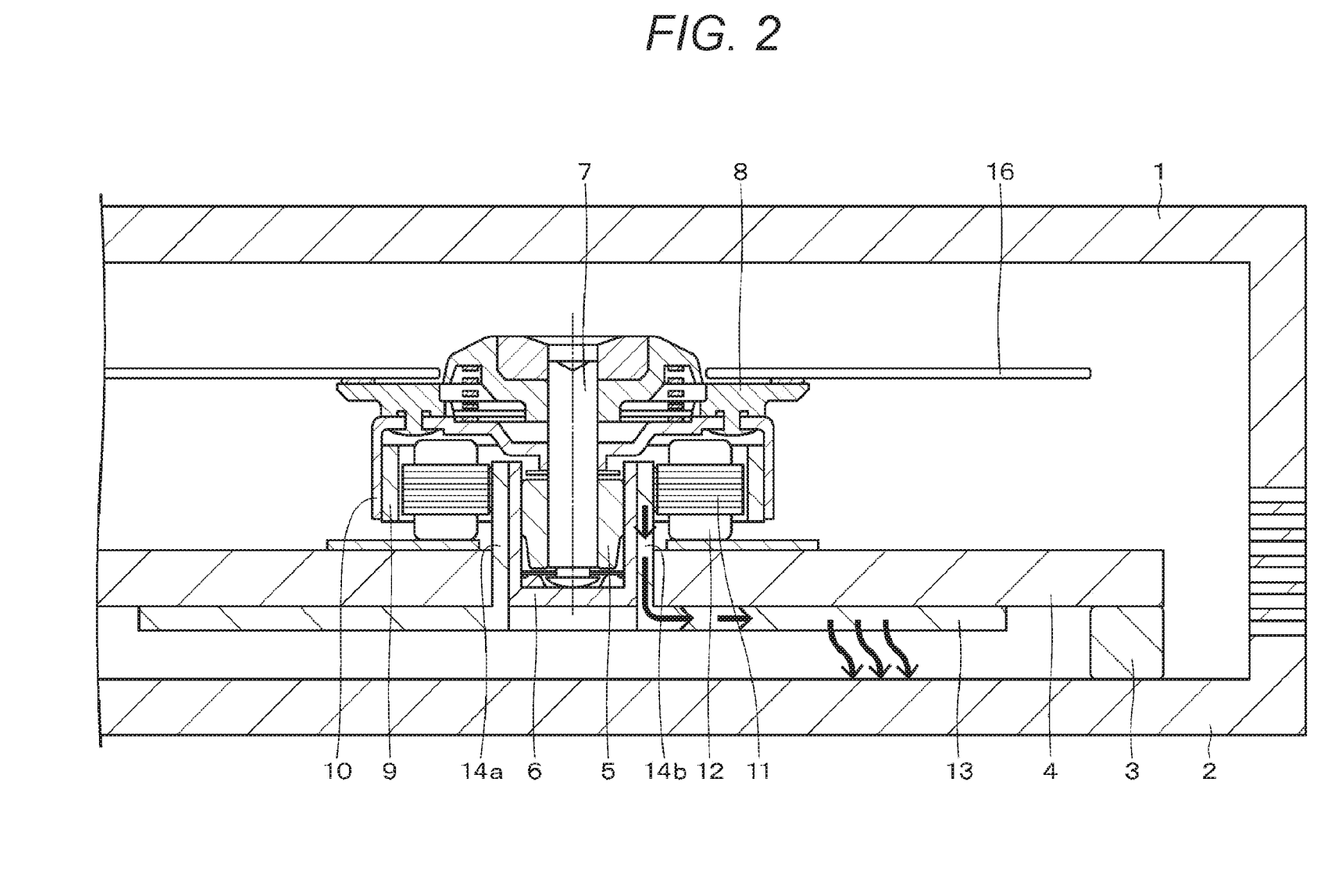
FIG. 2 is a partial cross-sectional view of the base unit.

As illustrated in FIG. 2, a base unit chassis 4 of resin (the base unit chassis 102 in FIG. 1) is attached to a bottom plate 2 of a case 1 of the base unit with an insulator 3 interposed therebetween. The insulator 3 functions as a damper. FIG. 2 illustrates a part of the configuration related to attachment of the spindle motor in the base unit chassis 4.

A bearing housing 6 for housing a bearing 5 is integrally formed with the base unit chassis 4. The bearing housing 6 is a cylindrical protrusion that protrudes upward from the base unit chassis 4. The bearing 5 is housed inside the cylindrical protrusion. The bearing 5 is, for example, a sintered body impregnated with a lubricating oil. A rotating shaft 7 passes through the center of the bearing 5. The rotating shaft 7 holds a radial load with the bearing 5 attached to the bearing housing 6, and in the bearing housing 6, a thrust receiver that holds a thrust load of the rotating shaft 7 and a rotor retainer that holds the spindle shaft so that the spindle does not come off when the optical disk is attached or detached are arranged.

A turntable 8 (the turntable 104 in FIG. 1) for detachable attachment of the rotation center of the optical disk 16 is attached to the rotating shaft 7. The turntable 8 is attached to a rotor case 10 that holds a rotor magnet 9. A stator is arranged to face the rotor magnet 9. The stator includes a stator core 11 having a laminated core configuration, and a stator coil 12 wound around each pole of the stator core 11.

Attachment is made such that the inner diameter portion of the stator core 11 is in contact with the outer diameter portion of the bearing housing 6. That is, the bearing housing 6 of resin is interposed between the bearing 5 and the inner diameter portion of the stator core 11. Although heat generation occurs due to a current flowing through the stator coil 12, it is suppressed by the bearing housing 6 that the heat is transferred to the bearing 5. Thus, the bearing 5 can be prevented from being deteriorated, and it is possible to prevent that the heat is transferred to the optical disk 16 through the rotating shaft 7 and the turntable 8 and the optical disk 16 is deformed.

Figure 3:
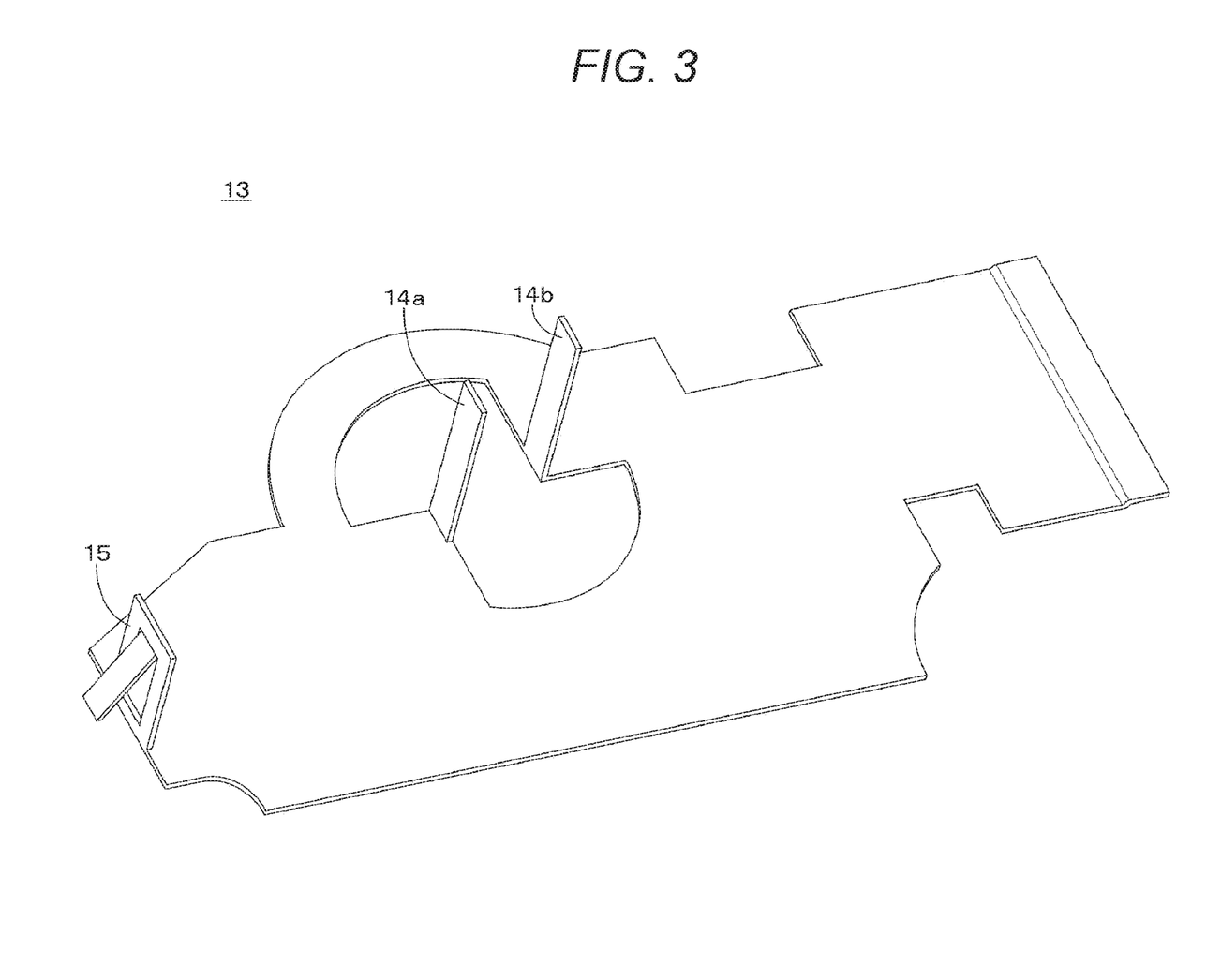
FIG. 3 is a perspective view of an example of a heat dissipation plate.

Moreover, in the embodiment, the heat generated in the stator coil 12 is dissipated to the non-disk mounting side (the lower side in this example) of the base unit chassis 4 by a heat dissipation member, for example, a heat dissipation plate 13 as illustrated in FIG. 3. The heat dissipation plate 13 includes a material having excellent heat conductivity, for example, aluminum, and is fixed to the lower surface of the base unit chassis 4. The heat dissipation plate 13 is attached to the base unit chassis 4, for example, by insertion of a locking claw 15 formed on the heat dissipation plate 13 into a notch of the base unit chassis 4. The heat dissipation plate 13 may be attached to the base unit chassis 4 by adhesion. The heat dissipation plate 13 includes a circular opening into which the bearing housing 6 of a cylindrical shape is inserted. A heat conductive portion is formed extending upward from the periphery of the opening.

Although the heat conductive portion can take various shapes, a portion in which a part of the heat dissipation plate 13 cut out and bent upward (referred to as a raised portion as appropriate) can be used as the heat conductive portion, for example, as illustrated in FIG. 3. As described above, the attachment is made such that the inner diameter portion of the stator core 11 is in contact with the outer diameter portion of the bearing housing 6. To bring raised portions 14a and 14b into contact with the inner diameter portion of the stator core 11, a part of the cylindrical surface of the outer diameter portion of the bearing housing 6 is cut out to form a groove extending in the vertical direction. The raised portions 14a and 14b are guided in the groove and come in contact with the inner diameter portion of the stator core 11.

Figure 4:
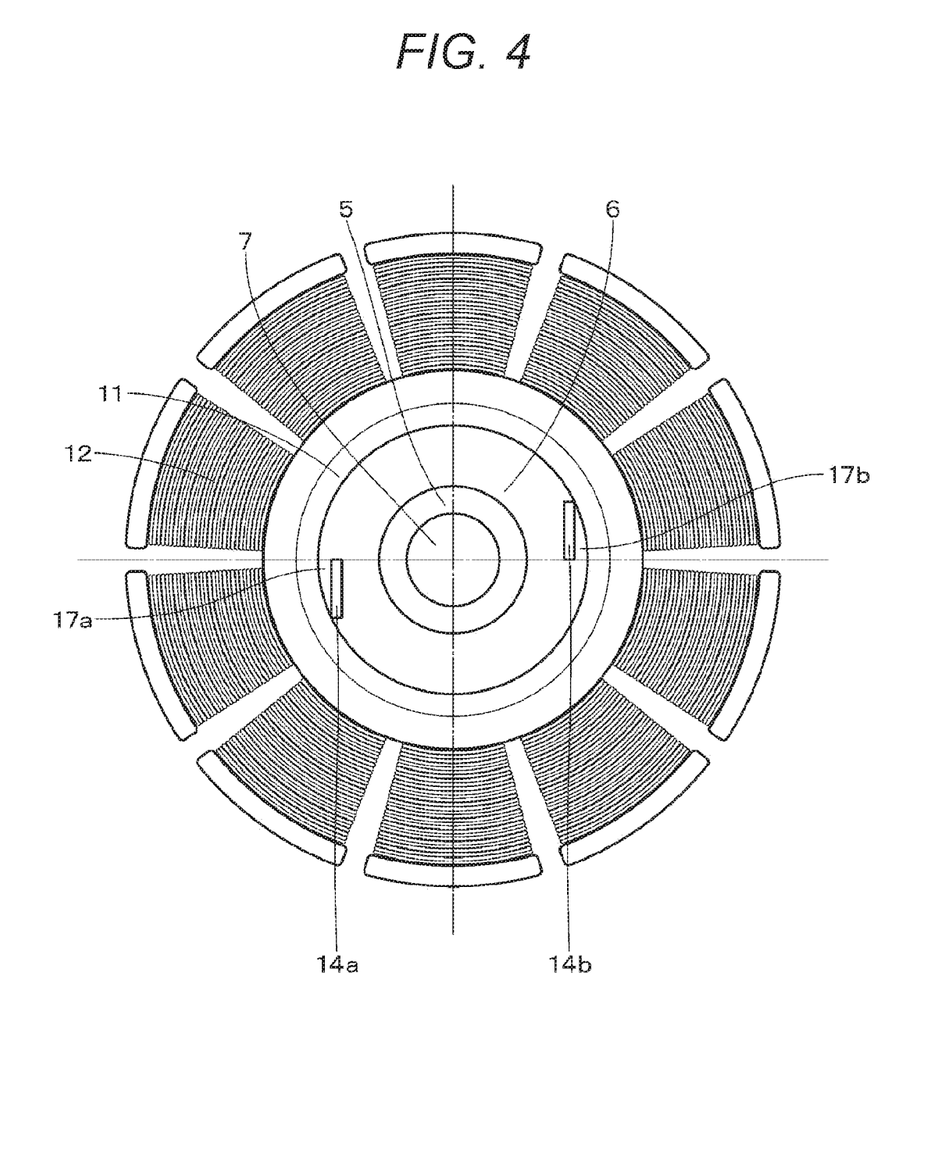
FIG. 4 is a plan view of a part of a base unit chassis.

That is, as illustrated in FIG. 4, the raised portions 14a and 14b by bending at two positions of the heat dissipation plate 13 pass through a through hole from the lower side of the base unit chassis 4, and the raised portions 14a and 14b are inserted to be sandwiched between a notch portion of the bearing housing 6 and the inner diameter portion of the stator core 11. To improve heat conductivity, gaps between the inner diameter portion of the stator core 11 and the raised portions 14a and 14b of the heat dissipation plate 13 are filled with heat transfer resin adhesives 17a and 17b.

In the embodiment of the present technology described above, as indicated by arrows in FIG. 2, the heat generated in the stator coil 12 comes in contact with the stator core 11 and is transferred to the raised portions 14a and 14b, and is further transferred to the heat dissipation plate 13. The heat is dissipated from the heat dissipation plate 13 downward. As described above, since the heat is dissipated to the non-disk mounting side, the heat is not applied to the lower surface of the optical disk 16, and deformation can be suppressed in which the optical disk 16 warps.

Figure 5:
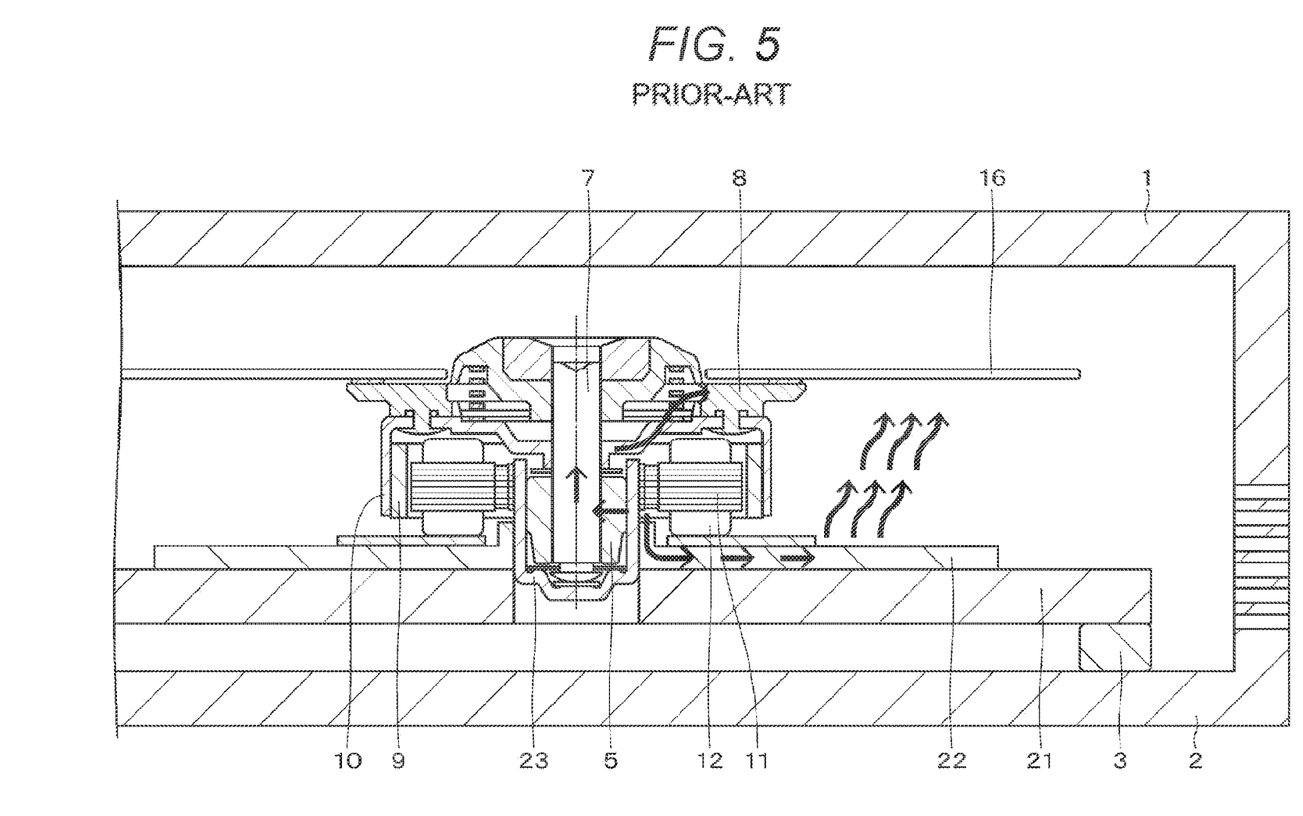
FIG. 5 is a partial cross-sectional view illustrating a comparative example.

FIG. 5 illustrates a configuration of a comparative example used for explaining an effect of the present technology. In the comparative example, a heat dissipation plate 22 is provided on the upper surface of a base unit chassis 21, that is, on the disk mounting surface side. The heat dissipation plate 22 comes in contact with a bearing housing 23, and the stator core 11 around which the stator coil 12 of the spindle motor is wound.

In the configuration of the comparative example, as indicated by arrows, the heat generated in the stator coil 12 is transferred to the stator core 11, and further, the heat is transferred from the stator core 11 to the heat dissipation plate 22. As a result, the heat is transferred to the bearing 5 and the rotating shaft 7, and there is a possibility that the bearing 5 is deteriorated or the optical disk 16 on the turntable 8 is deformed. The heat transferred to the heat dissipation plate 22 is dissipated upward and heats the lower surface of the optical disk 16. A temperature difference occurs between the upper surface and the lower surface of the optical disk 16, and there is a possibility that the optical disk 16 warps. As described above, in the configuration in which the heat dissipation plate 22 is attached to the upper surface of the base unit chassis 21, there is a possibility that deterioration of the bearing and deformation of the optical disk occur. Unlike the comparative example, the present technology can suppress the deterioration of the bearing and the deformation of the optical disk.

Figure 6:
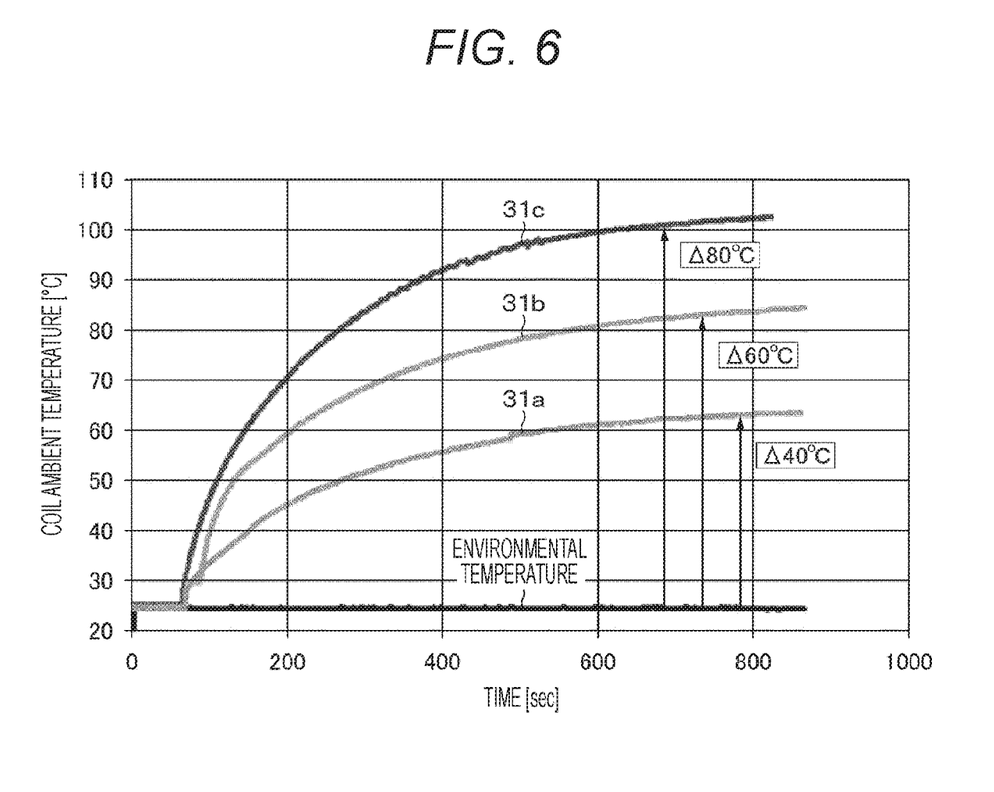
FIG. 6 is a graph for explaining an effect of the present technology.

FIG. 6 illustrates experimental data regarding a temperature rise when seek driving is repeatedly performed on the optical disk 16 in the configuration of the embodiment of the present technology. In the optical disk device, for example, in the method of reproducing the optical disk 16 with CLV, when an access position changes due to seek operation, it is necessary to accelerate/decelerate the rotational speed of the optical disk 16 depending on the access position, and a large current is caused to flow to enable high-speed seek, so that the amount of heat generation of the spindle motor increases.

FIG. 6 illustrates experimental data regarding the temperature rise when the seek driving is repeatedly performed on the optical disk 2. For example, a thermocouple was installed between adjacent stator coils 12 to measure the temperature. In FIG. 6, a graph 31c having the largest temperature rise value (80° C.) illustrates a temperature change in a case where no heat dissipation plate is provided. Furthermore, a graph 31b having the second largest temperature rise value (60° C.) illustrates a temperature change of the base unit (configuration of FIG. 5) according to the comparative example. A graph 31a having the smallest temperature rise value (40° C.) illustrates a temperature change according to the embodiment of the present technology. From FIG. 6, it can be seen that the temperature rise is suppressed in the embodiment of the present technology.

Furthermore, in the embodiment, the base unit chassis 4, the bearing housing 6, and the like are integrally formed together, whereby the number of parts can be reduced. Moreover, the work of attaching the spindle motor to the mounting plate can be simplified.

2. Modifications

The present technology is not limited to the embodiment described above, and various modifications and applications can be made without departing from the gist of the present technology. For example, in the embodiment, the thermal connection between the inner peripheral portion of the stator core and the raised portion of the heat dissipation plate is performed with a heat transfer adhesive, but other connection methods may be used. For example, depending on the material of the heat dissipation plate, connection may be made by fixing by welding, deposition, crimping, screws, and the like, or a substantially flat surface may be made in a part of the inner peripheral portion of the stator core to make surface contact with the heat dissipation plate, or the shape of the raised portion of the heat dissipation plate may be curved to match the shape of the inner peripheral portion of the stator core. The raised portion of the heat dissipation plate may be constituted by a component different from the heat dissipation plate.

Furthermore, in a case where only heat exhaustion to the non-mounting side of the optical disk is required, the configuration may be made only by a form in which the inner peripheral portion of the stator core and the heat dissipation plate are thermally connected together, or combination may be made with a bearing housing of metal.

Furthermore, the heat connection between the heat dissipation member and the stator core may be formed at a portion other than the inner peripheral portion of the stator core, or a part of the stator core may be bent and connected to the heat dissipation plate. For example, if a method of fixing the stator core to the base unit chassis is taken, the base unit chassis may have a gap with the bearing housing, and in that case, (a part of) the stator core and the heat dissipation plate are thermally connected together to dissipate heat to the lower surface of the base unit chassis.

Furthermore, the configurations, methods, processes, shapes, materials, numerical values, and the like of the embodiments described above can be combined with each other without departing from the gist of the present technology.

Note that, the present technology can also be configured as described below.

(1)

A base unit including:

a base unit chassis that supports a spindle motor;

a heat dissipation member that dissipates heat generated from a stator of the spindle motor to a non-disk mounting side of the base unit chassis; and a means that suppresses heat transfer from the stator core to a bearing of the spindle motor.

(2)

The base unit according to (1), in which the heat dissipation member is arranged on a lower surface of the base unit chassis, and is in contact with a stator core of the spindle motor to dissipate heat of the stator core to the lower surface of the base unit chassis.

(3)

The base unit according to (1), in which a bearing housing that houses the bearing of the spindle motor is integrally formed with the base unit, and the heat dissipation member is interposed between an outer peripheral surface of the bearing housing and the stator core.

(4)

The base unit according to (1), further including: a notch or a through hole formed in the bearing housing; and a part of the heat dissipation member guided through the notch or the through hole and in contact with the stator core.

(5)

The base unit according to (4), in which a heat transfer resin is interposed between the stator core and the heat dissipation member.

(6)

An optical disk device on which the base unit according to (1) is mounted.

REFERENCE SIGNS LIST

1 Case
4 Base unit chassis
5 Bearing
6 Bearing housings
7 Rotating shaft
9 Rotor magnet
11 Stator core
12 Stator coil
13 Heat dissipation plate
14a, 14b Raised portion
16 Optical disk

The invention claimed is:

1. A base unit, comprising:

a base unit chassis that supports a spindle motor;

a heat dissipation member configured to dissipate heat generated from a stator core of the spindle motor to a non-disk mounting side of the base unit chassis, wherein the heat dissipation member is on a lower surface of the base unit chassis, the heat dissipation member is in contact with the stator core of the spindle motor to dissipate the heat of the stator core to the lower surface of the base unit chassis, and the lower surface of the base unit chassis is the non-disk mounting side of the base unit chassis; and a bearing housing configured to suppress transfer of the generated heat from the stator core to a bearing of the spindle motor, wherein the bearing housing is between the bearing of the spindle motor and the stator core of the spindle motor.

2. The base unit according to claim 1, wherein the bearing housing houses the bearing of the spindle motor, and the heat dissipation member is between an outer peripheral surface of the bearing housing and the stator core.

3. The base unit according to claim 1, wherein the bearing housing comprises one of a notch or a through hole, and a part of the heat dissipation member is in contact with the stator core through the one of the notch or the through hole.

4. The base unit according to claim 3, wherein a heat transfer resin is between the stator core and the heat dissipation member.

5. An optical disk device, comprising:

a base unit, wherein the base unit comprises:

a base unit chassis that supports a spindle motor;

a heat dissipation member configured to dissipate heat generated from a stator core of the spindle motor to a non-disk mounting side of the base unit chassis, wherein the heat dissipation member is on a lower surface of the base unit chassis, the heat dissipation member is in contact with the stator core of the spindle motor to dissipate the heat of the stator core to the lower surface of the base unit chassis, and the lower surface of the base unit chassis is the non-disk mounting side of the base unit chassis; and a bearing housing configured to suppress transfer of the generated heat from the stator core to a bearing of the spindle motor, wherein the bearing housing is between the bearing of the spindle motor and the stator core of the spindle motor.

6. A base unit, comprising:

a base unit chassis that supports a spindle motor;

a heat dissipation member configured to dissipate heat generated from a stator core of the spindle motor to a non-disk mounting side of the base unit chassis; and a bearing housing configured to suppress transfer of the generated heat from the stator core to a bearing of the spindle motor, wherein the bearing housing is between the bearing of the spindle motor and the stator core of the spindle motor, the bearing housing comprises one of a notch or a through hole, and a part of the heat dissipation member is in contact with the stator core through the one of the notch or the through hole.

\* \* \* \* \*